United States Patent [19]

Ohnaka et al.

[11] Patent Number: 5,154,155
[45] Date of Patent: Oct. 13, 1992

[54] BOOST PRESSURE CONTROL SYSTEM FOR A SUPERCHARGED ENGINE

[75] Inventors: Hidemi Ohnaka; Masaaki Tanaka; Yuuichi Kato; Michio Furuhashi; Koichi Satoya; Yasuhiro Ooi, all of Susono, Japan

[73] Assignee: Toyota Jidosha Kabushiki Kaisha, Aichi, Japan

[21] Appl. No.: 731,253

[22] Filed: Jul. 17, 1991

[30] Foreign Application Priority Data

Oct. 12, 1990 [JP] Japan ................. 2-272420

[51] Int. Cl.⁵ ............................. F02B 33/00
[52] U.S. Cl. ................................. 123/564
[58] Field of Search .................. 60/600-603; 123/564

[56] References Cited

U.S. PATENT DOCUMENTS 4,530,339  7/1985  Oguma et al. ............ 123/564 X
4,556,038 12/1985  Okamoto et al. .......... 60/602 X
4,589,396  5/1986  Tokushima et al. ........ 123/564 X

FOREIGN PATENT DOCUMENTS 160025    9/1984  Japan .................... 123/564
60-75733  4/1985  Japan .
61-28716  2/1986  Japan .
61-31621  2/1986  Japan .
85221     4/1988  Japan .................... 123/564

Primary Examiner—Michael Koczo
Attorney, Agent, or Firm—Oliff & Berridge

[57] ABSTRACT

A boost pressure control system for an engine, by which a boost pressure of the engine is controlled in accordance with a load of the engine. The system controls the boost pressure in two different control modes, i.e., an acceleration mode and a normal mode, and when a degree of acceleration required becomes larger than a predetermined value, the acceleration mode is selected in which the boost pressure is made higher than in the normal mode. To avoid a sudden drop of the boost pressure, the system maintains the acceleration mode even after the completion of the acceleration, until the engine load becomes low enough that the boost pressure drops to the level at which the switching to the normal mode does not cause a sudden pressure drop.

6 Claims, 5 Drawing Sheets

BOOST PRESSURE CONTROL SYSTEM FOR A SUPERCHARGED ENGINE

BACKGROUND OF THE INVENTION

1. Field of the Invention

The present invention relates to a boost pressure control system for a vehicle engine.

2. Description of the Related Art

The boost pressure of an engine equipped with a supercharger is usually controlled in accordance with a load of the engine, such as an engine speed and a degree of opening of the throttle valve. Also, the boost pressure is controlled according to a degree of acceleration required by a vehicle driver, so that a required engine torque for the acceleration is obtained by increasing the boost pressure.

Japanese Unexamined Patent Publication No. 61-28716, for example, discloses this type of boost pressure control system, which is provided with a mechanical supercharger (i.e., a supercharger driven by the engine crankshaft) and an air bypass valve which controls an amount of air flow recirculated from a discharge side of the supercharger to an inlet side thereof.

This system utilizes a speed of opening of the throttle valve as a parameter representing a degree of acceleration requirement, and controls the operating speed of the air bypass valve according to the speed of opening of the throttle valve. Namely, when the speed of opening of the throttle valve is a large, positive value, this denotes that the degree of acceleration required is large, and the air bypass valve is closed at a higher speed determined by the speed of opening of the throttle valve, and thus the boost pressure is rapidly increased. Conversely, when the speed of opening of the throttle valve is a large, negative value, the air bypass valve is opened at a higher speed, and thus the boost pressure is rapidly lowered. This control enables the engine torque to be rapidly increased or reduced in response to the vehicle drivers need for an acceleration or deceleration.

Japanese Unexamined Patent Publication No. 60-75733 discloses a boost pressure control system in which the boost pressure is controlled in accordance with an engine speed and a degree of opening of the throttle valve. In this system, the boost pressure is increased for a predetermined time when the speed of opening of the throttle valve exceeds a predetermined speed. This control enables the engine torque to be increased during the acceleration. The boost pressure is returned to a set value for a normal operation, after said predetermined time has elapsed.

As explained above, the boost pressure control systems of the prior art control the boost pressure such that the boost pressure is increased to obtain a required acceleration torque when the degree of acceleration required becomes larger than a predetermined value.

In some cases, however, the boost pressure drop suddenly after the completion of the acceleration, in the prior art, and the resulting drop in the engine torque causes a deceleration of the vehicle larger than expected by the vehicle driver.

To compensate for this larger deceleration, the vehicle driver must readjust the amount of accelerator pedal depression, and this need for extra controls is a strain on the vehicle driver.

For example, in the boost pressure control system in the JPP, 28716 the opening of the air bypass valve is begun regardless of the engine load when the speed of opening of the throttle valve becomes a negative value at the completion of the acceleration. Nevertheless, when the engine speed drops after the completion of the acceleration, the speed of the mechanical supercharger drops in accordance with the engine speed, and therefore, even if the degree of opening of the bypass valve is kept at a constant value, the boost pressure of the engine drops with the drop in the engine speed. Consequently, if the opening of the bypass valve and the drop of the engine speed occur at the same time, the boost pressure drops more rapidly and the deceleration of the vehicle becomes greater than expected by the driver.

Also, in the boost pressure control system of JPP, 75733, the increased boost pressure is returned to a normal set value when a predetermined time has elapsed even if the acceleration is continued, and this causes a sudden drop in boost pressure and a resulting unexpected drop in the engine torque.

An object of the present invention is to provide a boost pressure control system by which the boost pressure can be rapidly increased upon an acceleration, and can avoid a sudden drop of the boost pressure at the completion of the acceleration, whereby a sudden drop of the engine torque is also avoided.

SUMMARY OF THE INVENTION

According to the present invention, there is provided a boost pressure control system for a vehicle engine comprising: a supercharger for boosting an inlet air of the engine; means for detecting a load of the engine; means for detecting a degree of acceleration required by a driver of the vehicle; control mode selecting means for selecting modes of control of the boost pressure control system, said control mode selecting means selecting a normal mode when said degree of required acceleration is larger than a predetermined value, and selecting an acceleration mode in which a boost pressure of the engine is higher than in said normal mode when said degree of required acceleration is lower than said predetermined value; adjusting means for changing the boost pressure of the engine in accordance with the load of the engine based on the relationships determined by the control mode selected by said control mode selecting means; and, a prohibition means for prohibiting a selection by said control mode selecting means of said normal mode when the boost pressure control system is controlled in said acceleration mode and the engine load is higher than a predetermined value.

The present invention will be better understood from the description of a preferred embodiment thereof, as set forth below, together with the accompanying drawings.

DESCRIPTION OF A PREFERRED EMBODIMENT

Figure 1:
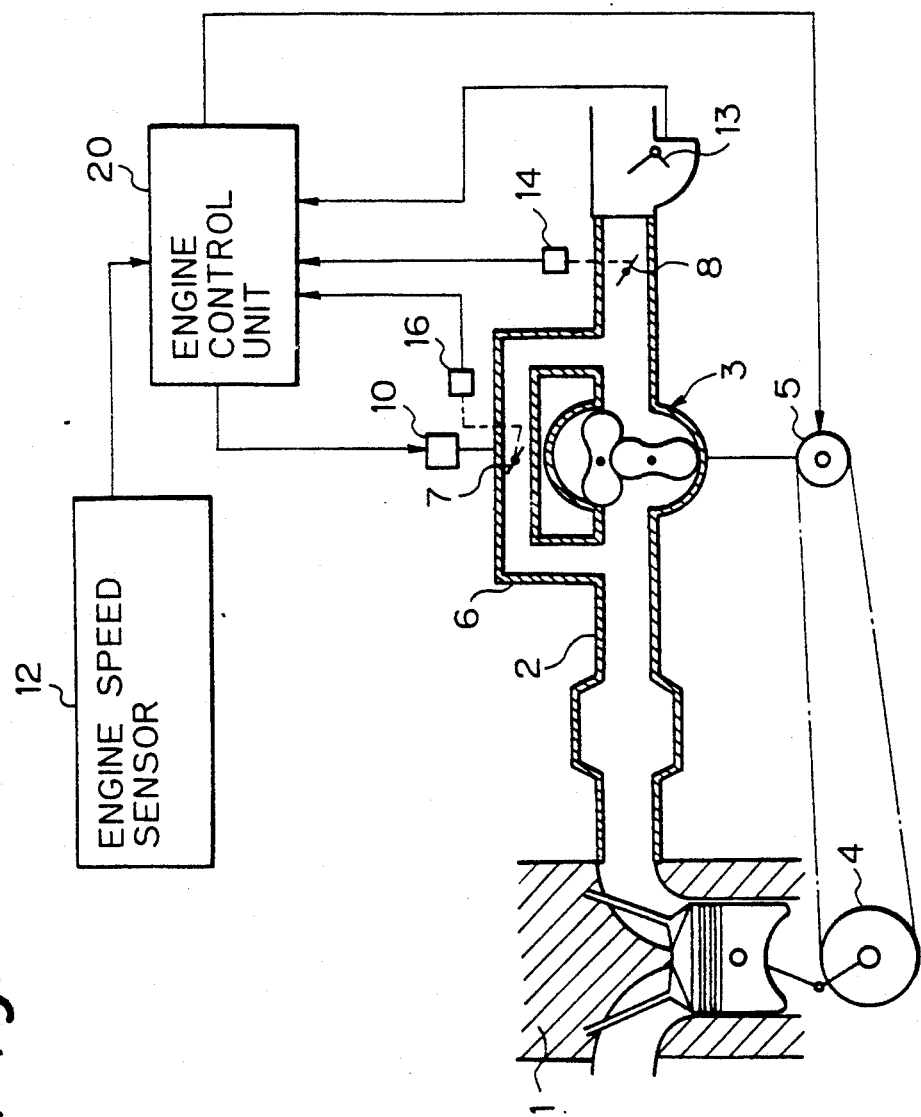
FIG. 1 is a schematic view of an engine.

FIG. 1 illustrates an embodiment of the boost pressure control system according to the present invention.

Referring to FIG. 1, reference numeral 1 represents an engine, 2 denotes an inlet air passage, and 3 denotes a supercharger mounted on the inlet air passage. In this embodiment, a Roots type blower is used as the supercharger 3.

The supercharger 3 is driven by a pulley 4 attached to the engine crankshaft through a drive belt and a magnetic clutch, and the operation of the supercharger can be started or stopped by connecting or disconnecting the magnetic clutch 5 during the operation of the engine 1.

Reference numeral 6 represents an air bypass passage, which bypasses the supercharger and connects the air inlet passage upstream and downstream of the supercharger.

An air bypass valve 7 is fitted in the air bypass passage 6, and the degree of opening of the air bypass valve 7 is controlled by an actuator 10, e.g., a stepping motor in this embodiment.

When the degree of opening of the air bypass valve 7 is large, the amount of air recirculated from the discharge side of the supercharger 3 to the inlet side thereof, through the air bypass passage 6, is increased, and thus the discharge pressure of the supercharger 3 (i.e., the boost pressure) is lowered. Conversely, when the degree of opening of the air bypass valve 7 is small, the amount of air recirculated through the air bypass passage 6 is reduced and the discharge pressure of the supercharger 3 is increased. Therefore, the boost pressure of the engine 1 can be controlled by adjusting the degree of opening of the air bypass valve 7.

A throttle valve 8 is installed in the inlet air passage 2, upstream of the supercharger 3, and the degree of opening of the throttle valve 8 is controlled in accordance with the amount of a depression of an accelerator pedal (not shown) by the driver.

Reference numeral 20 in FIG. 1 represents an engine control unit for performing fundamental controls, such as an ignition timing control or a fuel injection control, of the engine 1.

The engine control unit (ECU) 20 is a known type of digital computer, and further, performs the boost pressure control of the present invention.

For this purpose, various sensors for detecting parameters of the engine load condition are provided. For example, an engine speed sensor 12 for detecting an engine speed N, an air flow meter 13 for detecting an amount of engine inlet air flow Q, a throttle sensor 14 for detecting a degree of opening $\theta$ of the throttle valve 8, and an air bypass valve opening sensor 16 for detecting a degree of opening $\theta_B$ of the air bypass valve 7, are installed at the respective parts of the engine 1, and input signals representing these parameters to the ECU 20.

Also, an output port of the ECU 20 is connected to the stepping motor 10 of the air bypass valve via a drive circuit (not shown), for adjusting the degree of opening of the air bypass valve 7.

Figure 2:
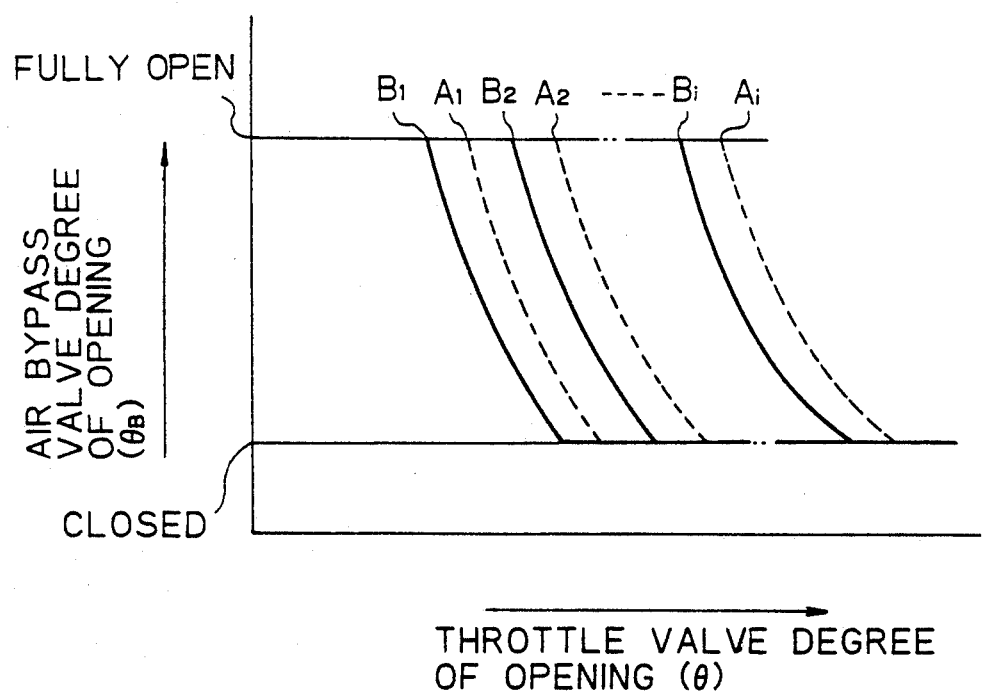
FIG. 2 illustrates the relationship between the degree of opening of the air bypass valve and the degree of opening of the throttle valve.

FIG. 2 illustrates an example of the control characteristics of the air bypass valve according to the present invention.

In this embodiment, the degree of opening $\theta_B$ of the air bypass valve is determined by the degree of opening $\theta$ of the throttle valve 8, the engine speed N, and the degree of acceleration required. In the figure, the horizontal axis represents the degree of opening $\theta$ of the throttle valve 8 and the vertical axis represents the degree of opening $\theta_B$ of the air bypass valve 7. The curves $A_1, A_2, \ldots A_i$ shown by dotted lines represent characteristic curves of the degree of opening of the air bypass valve in a normal mode at each engine speed. The subscripts $1, 2, \ldots i$ represent the engine speed, and the larger numbers thereof represent higher engine speeds.

Similarly, the curves $B_1, B_2, \ldots B_i$ shown by solid lines represent characteristic curves of the degree of opening of the air bypass valve in an acceleration mode at each engine speed. The same subscript number represents a same engine speed for both the $A_i$ and $B_i$.

For example, curves $A_1$ and $B_1$ represent the characteristics in the normal mode and the acceleration mode respectively, at the same engine speed.

In this embodiment, if the normal mode is selected, the degree of opening $\theta_B$ of the air bypass valve is determined by the degree of opening $\theta$ of the throttle valve, using one of the characteristic curves $A_1$-$A_i$ corresponding to the engine speed N.

The acceleration mode is selected when the degree of acceleration required becomes larger than a predetermined value, and the degree of opening $\theta_B$ of the air bypass valve is similarly determined by using one of the characteristics curve $B_1$-$B_i$.

In this embodiment, a rate of change in the degree of opening of the throttle valve $d\theta/dt$ (an opening speed) is used as a parameter representing a degree of acceleration required. The opening speed of the throttle valve corresponds to the speed of depression of the accelerator pedal by the vehicle driver, (i.e., operation rate) and this operation rate of the accelerator pedal is considered to be proportional to the degree of acceleration required by the driver.

As shown in FIG. 2, if the degree of opening of the throttle valve is maintained at a constant value, the degree of opening of the air bypass valve becomes smaller as the engine speed drops, and thus a drop in the boost pressure due to a drop in the engine speed is minimized.

Similarly, if the engine speed is the same, the degree of opening of the air bypass valve becomes smaller in the acceleration mode ($B_1, B_2, \ldots B_i$ in FIG. 2) than in the normal mode ($A_1, A_2, \ldots A_i$ in FIG. 2), to thereby obtain a higher boost pressure.

The control of the air bypass valve according to the invention is now explained with reference to FIG. 3.

Figure 3:
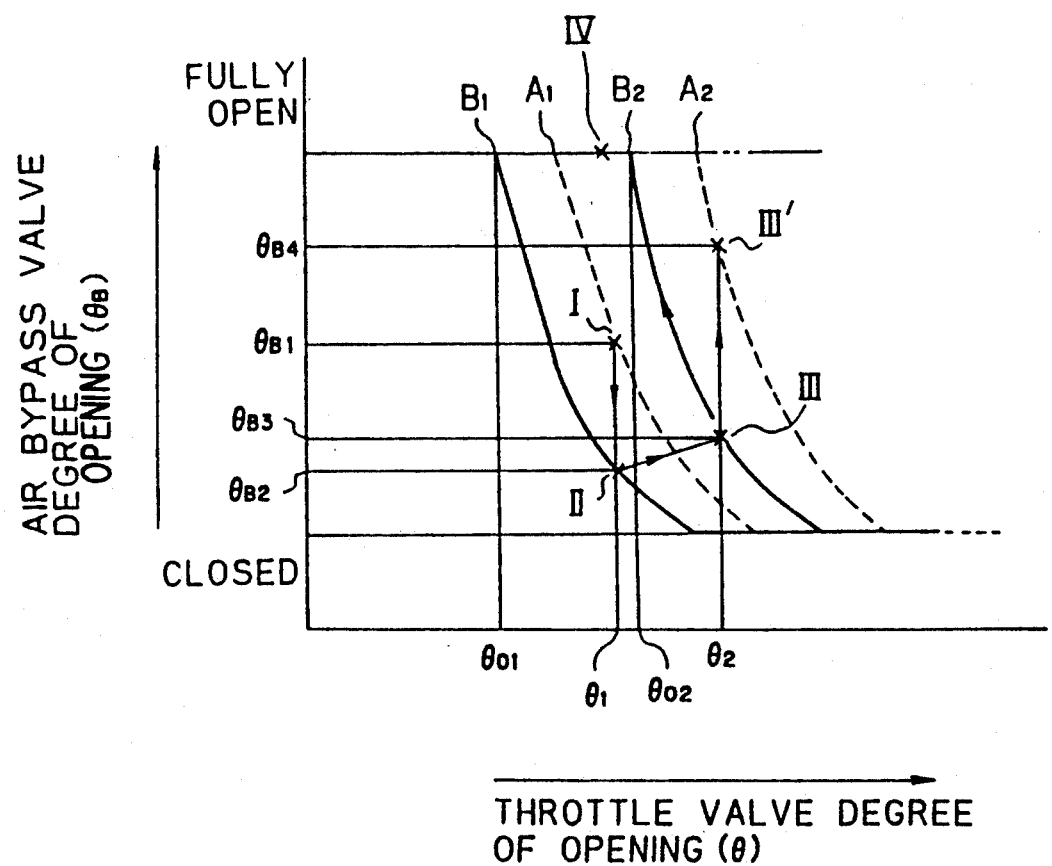
FIG. 3 is a diagram similar to FIG. 2, but on a larger scale, for explaining the operation of the boost pressure control system of the present invention; and, FIGS. 4A and 4B show a routine for controlling the air bypass valve according to the present invention.

FIG. 3 is a diagram similar to FIG. 2, but shows only the curves $A_1, A_2$, and $B_1, B_2$, to thus simplify the explanation.

The point I on the curve $A_1$ (i.e., a normal mode) corresponds to an engine operating condition in which the engine is operated in a steady condition (i.e., no acceleration is performed) at the engine speed $N_1$ and a degree of opening of the throttle valve $\theta_1$. In this condition, the degree of opening of the air bypass valve is $\theta_{B_1}$.

Assuming that an acceleration from this operating condition is required, and that the throttle valve is opened at a rate $d\theta/dt$ larger than the predetermined value, due to a depression of the accelerator pedal by the vehicle driver, then the control mode is switched to the acceleration mode, and the controlled point moves to point II on the curve $B_1$, which corresponds to an engine speed $N_1$ and a degree of opening of the throttle valve $\theta_1$. In this condition, the degree of opening of the air bypass valve is $\theta_{B2}$, i.e., smaller than $\theta_{B1}$, and thus the boost pressure is increased and a larger engine torque needed for the acceleration is obtained.

Then, if the acceleration is continued, the throttle valve is opened further and reaches a value $\theta_2$, and the engine speed increases to $N_2$ point III on curve $B_2$ in FIG. 2). Therefore, the degree of opening of the air bypass valve becomes $\theta_{B3}$, in accordance with this operating condition.

Assuming that the acceleration is completed at point III and a steady operation is resumed, in the control systems of the prior art, a sudden drop in the engine torque would occur.

In the control systems of the prior art, the control mode is switched from an acceleration mode to a normal mode as soon as $d\theta/dt$ becomes smaller than a predetermined value, and this causes the control point to be moved from point III on the curve $B_2$ to point III, on the curve $A_2$.

At the point III', the degree of opening of the air bypass valve is $\theta_{B4}$, i.e., larger than $\theta_{B3}$, and thus a sudden drop in the boost pressure and engine torque occurs due to the rapid opening of the air bypass valve. As explained before, this has an adverse affect on the driveability of the vehicle.

According to the present invention, the air bypass valve is controlled in the manner described below, to thereby prevent such a sudden drop of the engine torque.

In the boost control system according to the present invention, when the air bypass valve is controlled at the point III in FIG. 3, the control mode is not switched to the normal mode even if the acceleration is completed.

Namely, when the acceleration mode is selected, the control mode is not changed to the normal mode even if $d\theta/dt$ becomes smaller than the predetermined value, and therefore, the acceleration mode is maintained after the acceleration is completed, and the air bypass valve is controlled according to the characteristic curves $B_1$, $B_2$, ... $B_i$. The control mode is switched to the normal mode when the engine load becomes smaller than the load at which the air bypass valve is fully open.

For example, when the air bypass valve is controlled at point III in FIG. 3, the air bypass valve is controlled according to the curve $B_2$ also after the acceleration is completed. Then, if the engine load is reduced (i.e., the degree of opening of the throttle valve is reduced), the control point moves along the curve $B_1$. Then the control mode is changed to the normal mode at the point IV in FIG. 3, and the air bypass valve is controlled in accordance with the curve $A_2$ thereafter. The point IV is selected so that the degree of opening of the throttle valve becomes lower than the value $\theta_{B2}$ at which the air bypass valve is fully open in the acceleration mode. As explained before, at a same engine speed and same throttle valve opening, if the air bypass valve is fully open in the acceleration mode, it is always fully open in the normal mode, and therefore, the air bypass valve remains fully open when the control mode is switched from the acceleration mode (curve $B_2$) to the normal mode (curve $A_2$) at the point IV, and thus the boost pressure (i.e., engine torque) is not affected by the change of the control mode.

If the engine speed is changed, for example, from $N_2$ to $N_1$, during the above process, the control mode is switched to the normal mode when the degree of opening of the throttle valve becomes smaller than $\theta_{01}$, at which the air bypass valve is fully open according to the curve $B_1$.

Figure 4A:
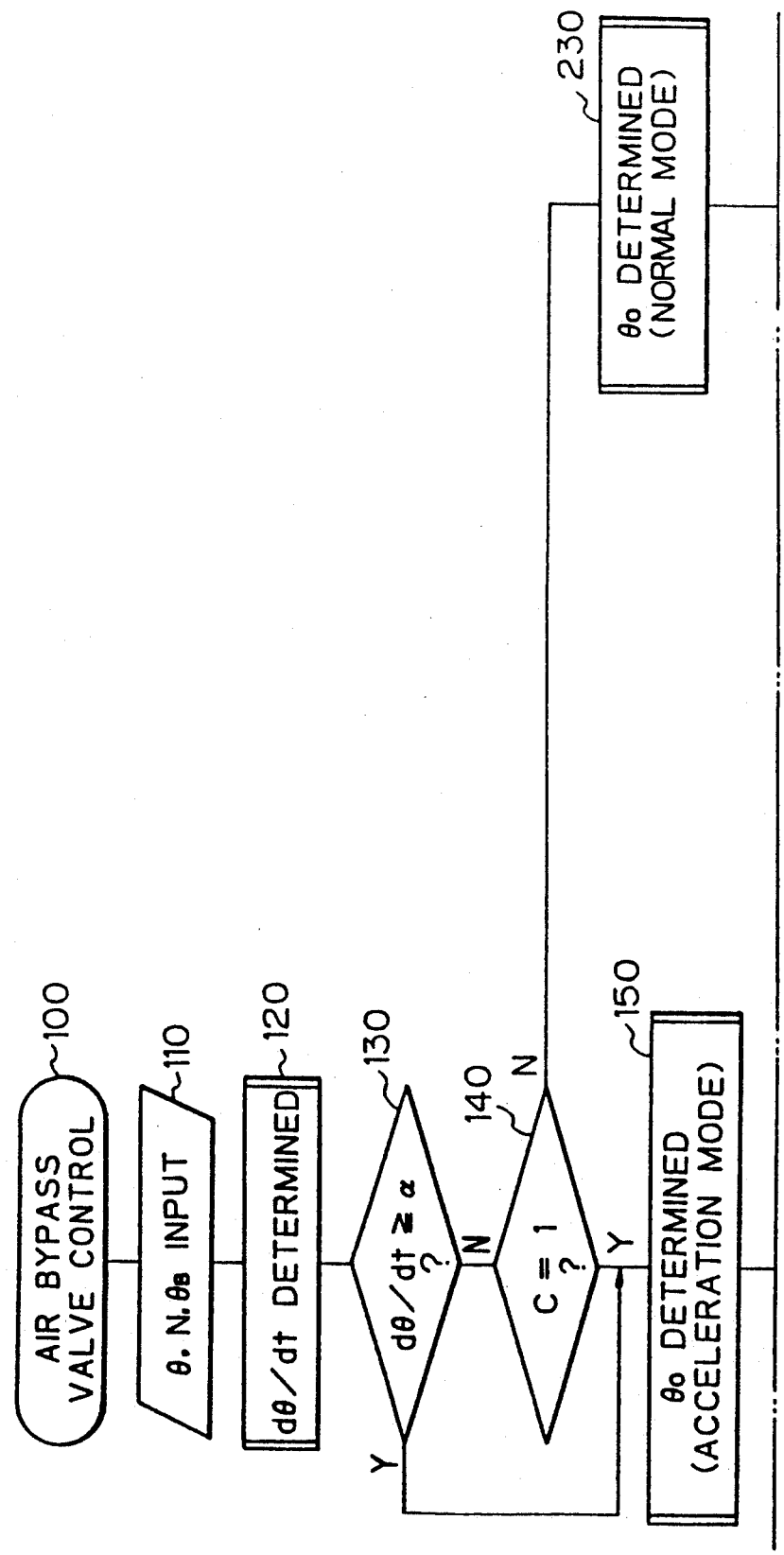
Figure 4B:
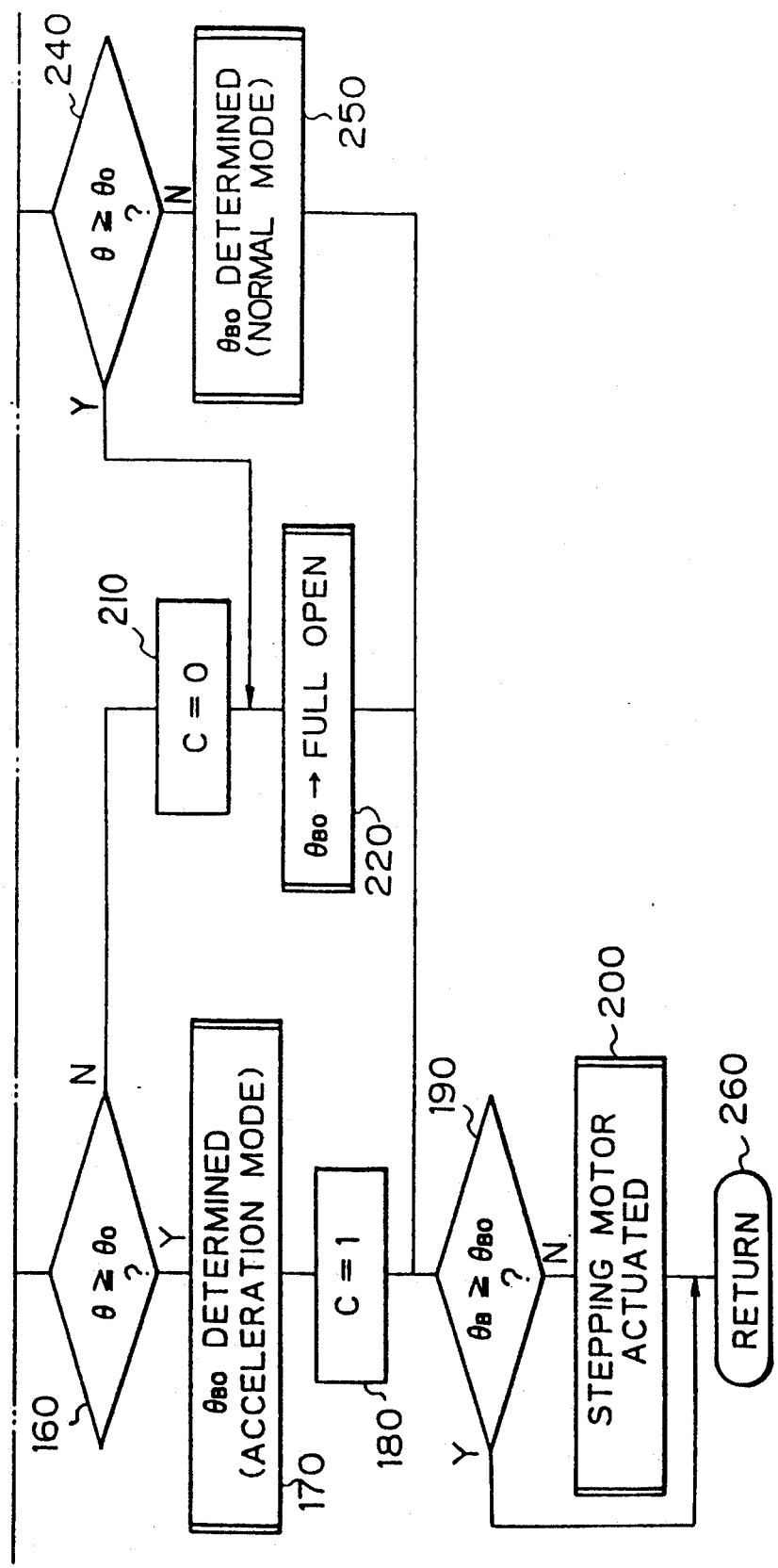

FIG. 4 shows the routine for controlling the air bypass valve. This routine is processed by the engine control unit 20 in FIG. 1 by sequential interruptions at predetermined intervals (e.g., 16 msec).

Referring to FIG. 4A, in step 110, parameters such as the engine speed N, the degree of opening of the throttle valve $\theta$, and the degree of opening of the air bypass valve $\theta_B$ are read by the respective sensors 12, 14, 16, and in step 120, the degree of acceleration required (the rate of change in the degree of opening of the throttle valve) $d\theta/dt$ is calculated. This $d\theta/dt$ is obtained as a difference between the present value of the degree of opening of the throttle valve ($\theta$) read in step 110, and the value of the same ($\theta_{old}$) read when the routine was last executed ($d\theta/dt = \theta - \theta_{old}$).

Then, in step 130, it is determined whether $d\theta/dt$ is larger than a predetermined value $\alpha$, and if $d\theta/dt$ is larger than or equal to $\alpha$, the air bypass valve is controlled according to the acceleration mode by the steps following step 150.

Namely, in step 150, the characteristic curve corresponding to the engine speed N, is selected from the acceleration mode characteristic curves ($B_1$, $B_2$, ... $B_i$) and the degree of opening of throttle valve $\theta_o$ at which the air bypass valve is fully open is determined from this selected characteristic curve.

Then, in step 160, it is determined whether the present degree of opening of the throttle valve $\theta$ is larger than or equal to $\theta_o$. If $\theta$ is larger than or equal to $\theta_o$, then in step 170, the value $\theta_{BO}$ of the degree of opening of the air bypass valve is determined from $\theta$ and the characteristic curve selected in step 150.

Then, in step 180, a flag C is set and the routine proceeds to step 190. The flag C represents the selected control mode, and when set, the flag C indicates that the acceleration mode is selected. As explained later, a switching of the control mode is prohibited when the flag C is set.

Step 190 and step 200 show the operation of setting the air bypass valve. In step 190, it is determined whether the value $\theta_{BO}$ of the degree of opening of the air bypass valve to be set is equal to the actual value $\theta_B$ thereof.

If a difference between $\theta_{BO}$ and $\theta_B$ exists, an actuation signal is transmitted in step 200 to the drive circuit of the stepping motor 10 (FIG. 2) of the air bypass valve. The stepping motor may be actuated such that the stepping motor is operated by a predetermined constant amount (in a forward or a reverse rotation) per one execution of the routine, or such that the stepping motor is operated by an amount determined by the amount of difference between $\theta_{BO}$ and $\theta_B$ per one execution of this routine.

Returning to step 160, if $\theta$ is smaller than $\theta_o$, the routine proceeds to step 210, in which the flag C is reset, and in step 220, the value $\theta_{BO}$ of the degree of opening of the air bypass valve is set at the fully open position, and the routine then goes to steps 190 and 200.

In step 130, if $d\theta/dt$ is smaller than the predetermined value $\alpha$, in step 140 it is determined whether the flag C is set.

If C is set, this means that the acceleration mode was selected when the routine was last executed. In this case, since the selection of the normal mode is prohibited, the routine proceeds to step 150 and the acceleration mode is selected even if dθ/dt is smaller than α.

Conversely, if the flag C is reset, the selecting of the normal mode is allowed, as this means that the normal mode was selected when the routine was last executed, or that the air bypass valve is already set at the fully open position.

In this case, step 230 to 250 are processed and the degree of opening of the air bypass valve is set according to the normal mode characteristic curves ($A_1$, $A_2$, ... $A_n$ in FIG. 2), in the same manner as in steps 150 to 170.

As explained above, when the boost pressure control system is operated in the acceleration mode, the system continues to select the acceleration mode even if the degree of acceleration required becomes smaller than the predetermined value (steps 130 and 140). The switching from the acceleration mode to the normal mode is allowed only when it is determined in step 160 that the engine load has become smaller than the load value at which the bypass air valve is set to the fully open position.

In this embodiment, only one set of characteristic curves ($B_1$, $B_2$, ... $B_i$) is provided for the acceleration mode, regardless of the degree of acceleration required, but a plurality of sets of the characteristic curves ($B_1$-$B_i$, $B_1'$-$B_i'$, $B_1''$-$B_i''$, ... ) may be adopted for the acceleration mode, so that the air bypass valve can be controlled by a set of characteristic curves selected from among a plurality of sets, according to the degree of acceleration required.

According to the present invention, the boost pressure can be rapidly increased upon an acceleration, and a sudden drop of the boost pressure at the completion of the acceleration can be avoided.

We claim:

1. A boost pressure control system for an engine comprising:
    a supercharger for boosting an inlet air pressure of the engine;
    means for detecting a load of the engine;
    means for detecting a degree of acceleration required by an operation of an accelerator pedal;
    control mode selecting means for selecting control modes of the boost pressure control system according to said degree of acceleration required, said control mode selecting means selecting a normal mode when said degree of acceleration required is smaller than a predetermined value, and selecting an acceleration mode when said degree of acceleration required is larger than or equal to said predetermined value, the boost pressure of the engine in said acceleration mode being set higher than in said normal mode;
    adjusting means for adjusting the boost pressure of the engine in accordance with the engine load, based on the relationships determined by the control mode selected by said control mode selecting means; and
    a prohibition means for prohibiting a selection by said control mode selecting means of said normal mode when the boost pressure control system is controlled in said acceleration mode and the engine load is higher than a predetermined value.

2. A boost pressure control system according to claim 1, wherein said supercharger is driven by a crankshaft of the engine, and said adjusting means comprises an air bypass passage connecting the inlet and discharge sides of said supercharger, and an air bypass valve disposed in said air bypass passage for adjusting an amount of air flow recirculated therethrough from the discharge side to the inlet side of the supercharger.

3. A boost pressure control system according to claim 2, wherein said air bypass valve is controlled such that the degree of opening of the air bypass valve is increased as the engine load is lowered, and at a same engine load, the degree of opening of the air bypass valve is made larger in said normal mode than in said acceleration mode.

4. A boost pressure control system according to claim 3, wherein said predetermined engine load above which said prohibition means prohibits the selection of the normal mode is lower than or equal to the engine load at which the degree of opening of the air bypass valve is set to a fully open position in the acceleration mode.

5. A boost pressure control system according to claim 4, wherein said means for detecting a load of the engine detects an engine load by detecting a degree of opening of a throttle valve disposed in an inlet air passage of the engine.

6. A boost pressure control system according to claim 5, wherein said means for detecting a degree of acceleration required detects a degree of acceleration required by detecting a rate of change in the degree of opening of the throttle valve.

* * * * *